United States Patent
Lee et al.

(10) Patent No.: US 8,054,607 B2
(45) Date of Patent: Nov. 8, 2011

(54) MULTILAYER CHIP CAPACITOR AND CIRCUIT BOARD DEVICE

(75) Inventors: Byoung Hwa Lee, Gyunggi-do (KR); Dong Seok Park, Seoul (KR); Young Ghyu Ahn, Gyunggi-do (KR); Sang Soo Park, Gyunggi-do (KR); Min Cheol Park, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 176 days.

(21) Appl. No.: 12/649,071

(22) Filed: Dec. 29, 2009

(65) Prior Publication Data

US 2011/0056735 A1 Mar. 10, 2011

(30) Foreign Application Priority Data

Sep. 10, 2009 (KR) .................. 10-2009-0085356

(51) Int. Cl.
*H01G 4/005* (2006.01)
(52) U.S. Cl. .............. 361/306.3; 361/321.2; 361/303; 361/767; 361/763
(58) Field of Classification Search .............. 361/767, 361/782, 763, 766, 306.3, 306.1, 321.2; 257/300–303
See application file for complete search history.

(56) References Cited

U.S. PATENT DOCUMENTS

| 6,433,995 B2 * | 8/2002 | Nakagawa et al. ........... 361/311 |
| 6,970,342 B1 * | 11/2005 | Togashi ........................ 361/303 |
| 7,177,137 B2 | 2/2007 | Ritter et al. |
| 7,688,568 B1 * | 3/2010 | Lee et al. ..................... 361/306.3 |
| 2008/0186652 A1 | 8/2008 | Lee et al. |
| 2008/0253059 A1 * | 10/2008 | Eggerding et al. ......... 361/301.4 |

FOREIGN PATENT DOCUMENTS

| JP | 2005-108890 | 4/2005 |
| KR | 10-2004-0087934 | 10/2004 |
| KR | 10-2007-0053800 A | 5/2007 |
| KR | 10-2008-073193 | 8/2008 |
| KR | 10-2009-059748 | 6/2009 |

OTHER PUBLICATIONS

Korean Office Action, with English translation, issued in Korean Patent Application No. 10-2009-0085356, mailed Dec. 23, 2010.

* cited by examiner

*Primary Examiner* — Nguyen T Ha
*Assistant Examiner* — Hung Dang
(74) *Attorney, Agent, or Firm* — McDermott Will & Emery LLP

(57) ABSTRACT

There are provided a multilayer chip capacitor and a circuit board device. The multilayer chip capacitor includes a capacitor body including a plurality of dielectric layers that are stacked, first and second outer electrodes formed on an outer surface of the capacitor body and having opposite polarity, first and second inner electrodes opposing each other, interleaved with the dielectric layers in the capacitor body, and each including an electrode plate forming capacitance and a lead extending from the electrode plate, the lead of the first inner electrode and the lead of the second electrode being respectively connected to the first and second outer electrodes, and third inner electrodes interposed between the first and second inner electrodes. At least one of the third inner electrodes adjacent to the first inner electrode includes a conductive pattern having the same shape as the lead of the first inner electrode and is connected to the first outer electrode. At least one of the third inner electrodes adjacent to the second inner electrode includes a conductive pattern having the same shape as the lead of the second inner electrode and is connected to the second outer electrode.

23 Claims, 14 Drawing Sheets

US 8,054,607 B2

MULTILAYER CHIP CAPACITOR AND CIRCUIT BOARD DEVICE

CROSS-REFERENCE TO RELATED APPLICATIONS

This application claims the priority of Korean Patent Application No. 10-2009-0085356 filed on Sep. 10, 2009, in the Korean Intellectual Property Office, the disclosure of which is incorporated herein by reference.

BACKGROUND OF THE INVENTION

1. Field of the Invention

The present invention relates to a multilayer chip capacitor, and a circuit board device including the same.

2. Description of the Related Art

A multilayer chip capacitor is employed as a decoupling capacitor in a large scale integration (LSI) power circuit. Notably, when a power circuit experiences a rapid change in load current, the multilayer chip capacitor serves to suppress voltage noise by supplying current to a central processing unit (CPU) or the like.

In order to suppress noise sufficiently, a decoupling capacitor needs to have low equivalent series inductance (hereinafter, 'ESL'), and this need has been rising due to the trend toward high-current, high-frequency electronic devices.

Typically, a multilayer chip capacitor includes a capacitor body having a stacked structure of a plurality of dielectric layers, and inner electrodes disposed inside the capacitor body and forming capacitance, and outer electrodes disposed on the outer side of the capacitor body and electrically connected to the inner electrodes. In this case, the smaller the pitch is between the outer electrodes, the lower the ESL value may become. This is because a reduction in the pitch may shorten a current path within the capacitor.

However, a reduction in pitch between outer electrodes may increase the possibility of short-circuit between the outer electrodes of opposite polarity. Outer electrodes may be applied using electroless plating, which allows a pitch between the outer electrodes to be controlled with high precision.

SUMMARY OF THE INVENTION

An aspect of the present invention provides a multilayer chip capacitor capable of enhancing process reliability in a process of applying outer electrodes using electroless plating, and lowering ESL by ensuring a sufficient width of an active region, and a circuit board device including the same.

According to an aspect of the present invention, there is provided a multilayer chip capacitor including: a capacitor body including a plurality of dielectric layers that are stacked; first and second outer electrodes formed on an outer surface of the capacitor body and having opposite polarity; first and second inner electrodes opposing each other, interleaved with the dielectric layers in the capacitor body, and each including an electrode plate forming capacitance and a lead extending from the electrode plate, the lead of the first inner electrode and the lead of the second electrode being respectively connected to the first and second outer electrodes; and third inner electrodes interposed between the first and second inner electrodes. At least one of the third inner electrodes adjacent to the first inner electrode includes a conductive pattern having the same shape as the lead of the first inner electrode and is connected to the first outer electrode, and at least one of the third inner electrodes adjacent to the second inner electrode includes a conductive pattern having the same shape as the lead of the second inner electrode and is connected to the second outer electrode.

The first inner electrode, the third inner electrode including the conductive pattern having the same shape as the lead of the first inner electrode, the second inner electrode, and the third inner electrode including the conductive pattern having the same shape as the lead of the second inner electrode may constitute a block, and the block may be repetitively stacked in the capacitor body.

At least one of the third inner electrodes may include conductive patterns having the same shapes as the lead of the first inner electrode and the lead of the second inner electrode.

The third inner electrodes may be configured to preclude capacitance formation with the first and second inner electrodes. To this end, the third inner electrodes may not overlap the electrode plate of the first inner electrode and the electrode plate of the second inner electrode in a stacked direction in which the plurality of dielectric layers are stacked.

The lead of the first inner electrode may be connected with the conductive pattern of the third inner electrode having the same shape as the lead of the first inner electrode by the first outer electrode.

The lead of the second inner electrode may be connected with the conductive pattern of the third inner electrode having the same shape as the lead of the second inner electrode by the second outer electrode.

The first and second outer electrodes may be formed by electroless plating.

When a region in which capacitance is formed by the first and second inner electrodes in the capacitor body is defined as an active region, the first and second outer electrodes may be formed only in the active region.

At least one of the third inner electrodes adjacent to the first inner electrode may include a conductive pattern having the same shape as the first inner electrode, and at least one of the third inner electrodes adjacent to the second inner electrode may include a conductive pattern having the same shape as the second inner electrode.

The first and second outer electrodes may be formed on opposing side surfaces of the capacitor body, respectively and extend to top and bottom surfaces of the capacitor body.

In this case, the leads of the first and second inner electrodes may respectively contact the first and second outer electrodes in the side, top and bottom surfaces of the capacitor body.

The first and second inner electrodes may be disposed vertically on the top and bottom surfaces of the capacitor body.

The first and second outer electrodes may be formed on one surface of the capacitor body, the first outer electrode may include two first outer electrodes, and the second outer electrode may include a single second outer electrode disposed between the two first outer electrodes.

In this case, the first and second inner electrodes may be disposed vertically on the one surface of the capacitor body on which the first and second outer electrodes are formed.

The first and second outer electrodes may be formed on a surface opposite to the one surface of the capacitor body and have the same shapes as those on the one surface. In this case, the first outer electrode may have a portion formed on a side surface of the capacitor body to connect portions of the first outer electrode respectively formed on the one and opposite surfaces of the capacitor body.

The first inner electrode may have an H-shape.

The second inner electrode may have a cross (+) shape.

The first and second outer electrodes may each be formed on one surface of the capacitor body, and respectively include two first outer electrodes and two second outer electrodes that are arranged in an alternating manner. In this case, the first and second inner electrodes may be disposed vertically on the one surface of the capacitor body on which the first and second outer electrodes are formed.

The first and second outer electrodes may be further formed on a surface opposite to the one surface of the capacitor body such that the second outer electrodes oppose the first outer electrodes.

According to another aspect of the present invention, there is provided a circuit board device including: a circuit board including a mounting portion and first and second electrode pads disposed on the mounting portion; and a multilayer chip capacitor including: a capacitor body mounted on the mounting portion of the circuit board, including a plurality of dielectric layers that are stacked and having first and second side surfaces opposing each other and a bottom surface connected to the first and second side surfaces; first and second outer electrodes formed on the bottom surface of the capacitor body, having opposite polarity and respectively connected to the first and second electrode pads; first and second inner electrodes opposing each other, interleaved with the dielectric layers in the capacitor body, and each including an electrode plate forming capacitance and a lead extending from the electrode plate, the lead of the first inner electrode and the lead of the second electrode being respectively connected to the first and second outer electrodes; and third inner electrodes interposed between the first and second inner electrodes. At least one of the third inner electrodes adjacent to the first inner electrode includes a conductive pattern having the same shape as the lead of the first inner electrode and is connected to the first outer electrode, and at least one of the third inner electrodes adjacent to the second inner electrode includes a conductive pattern having the same shape as the lead of the second inner electrode and is connected to the second outer electrode.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
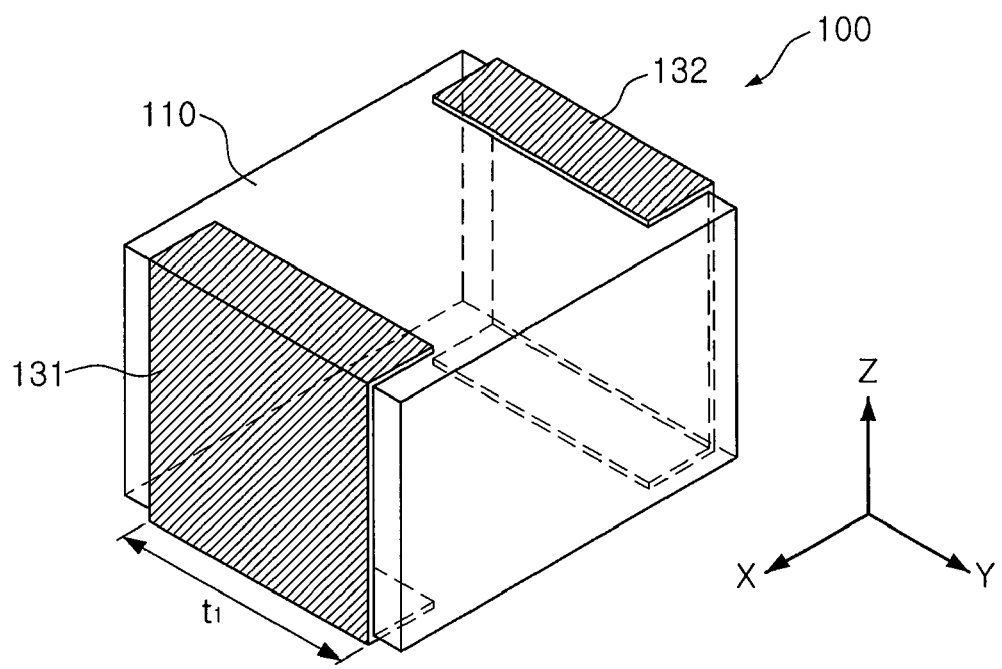
FIG. 1 is a schematic perspective view illustrating the exterior of a multilayer chip capacitor according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity. Like reference numerals in the drawings denote like elements.

Figure 2:
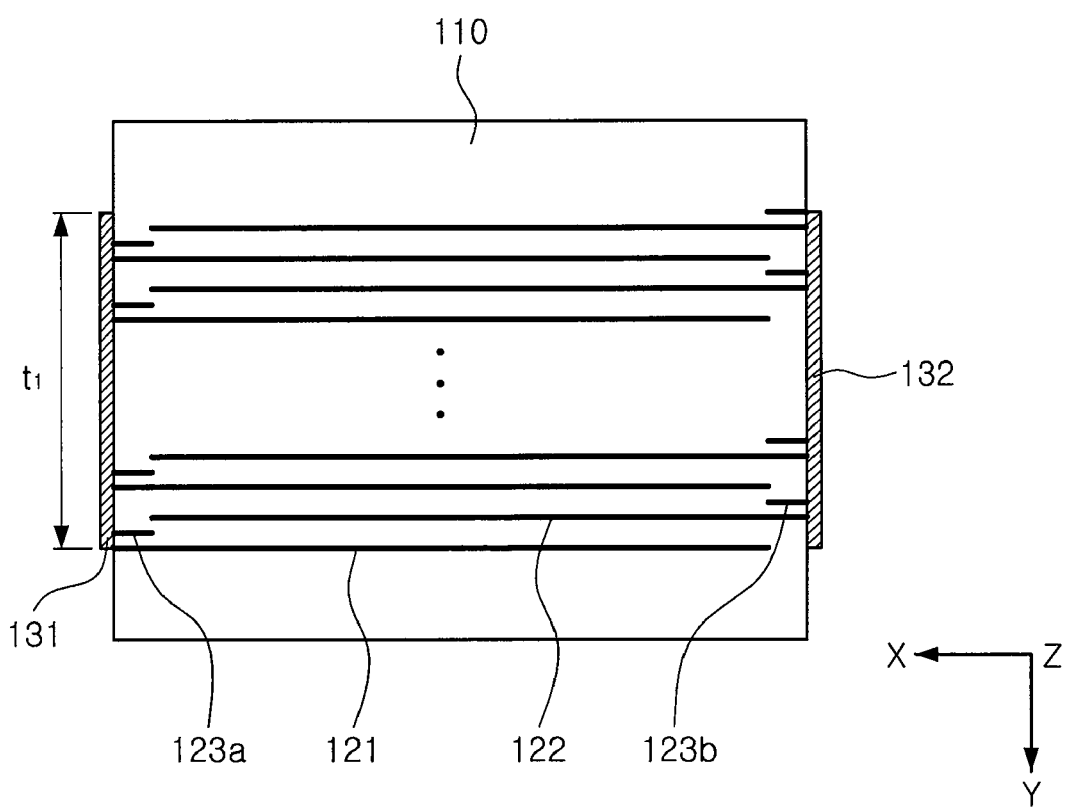
FIGS. 2 and 3 are schematic cross-sectional views for explaining the configuration of inner electrodes provided in the multilayer chip capacitor of FIG. 1.
Figure 3:
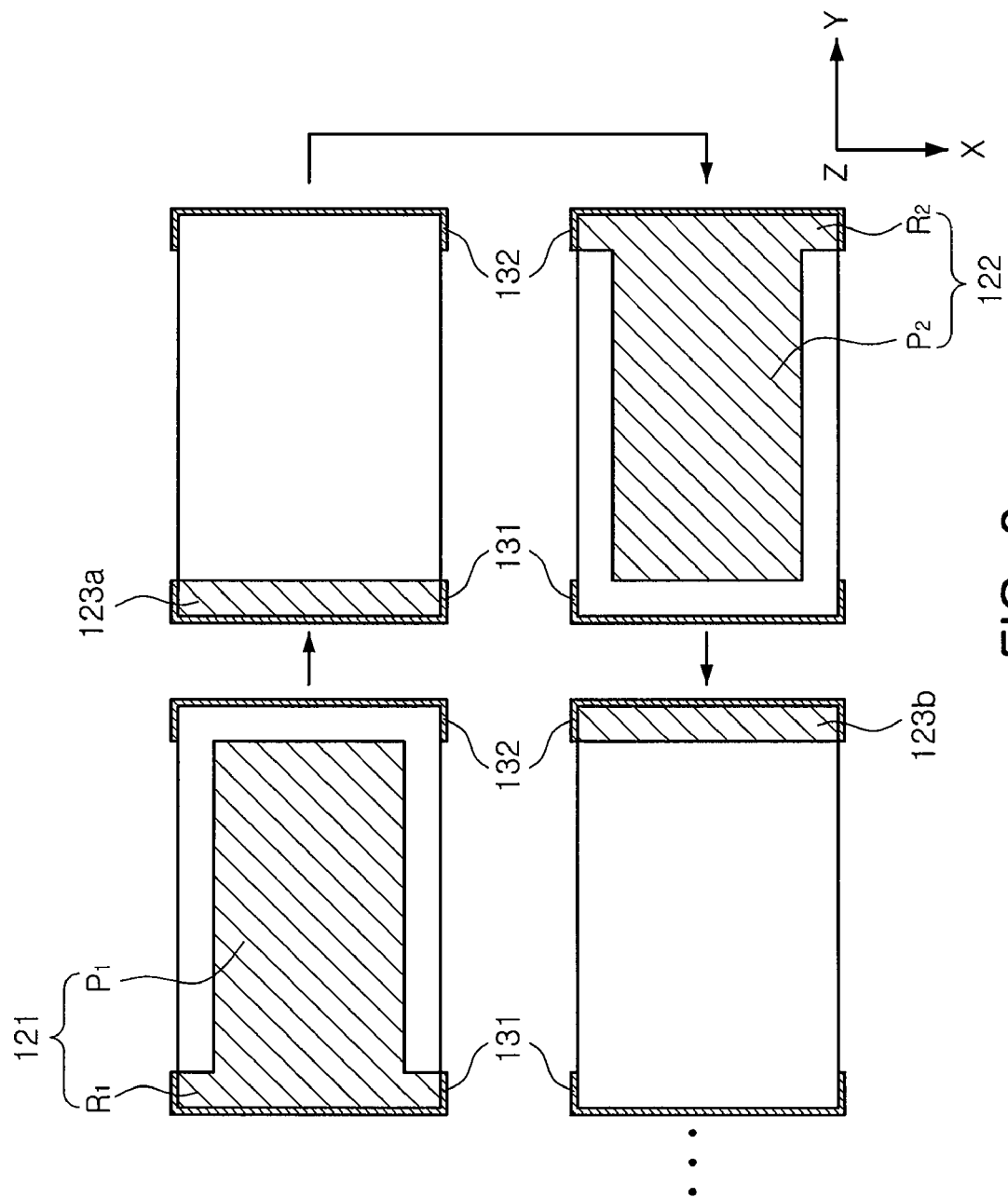

FIG. 1 is a schematic perspective view illustrating the exterior of a multilayer chip capacitor according to an exemplary embodiment of the present invention. FIGS. 2 and 3 are schematic cross-sectional views for explaining the configuration of inner electrodes provided in the multilayer chip capacitor of FIG. 1.

Referring to FIG. 1, a multilayer chip capacitor 100 according to this embodiment includes a capacitor body 110, and outer electrodes 131 and 132 (hereinafter, 'first and second outer electrodes' respectively) respectively formed on side surfaces of the capacitor body 110. The capacitor body 110 is formed by stacking a plurality of dielectric layers, and may have a rectangular parallelepiped shape or another similar shape. As shown in FIG. 1, the first and second outer electrodes 131 and 132 of opposite polarity may be disposed on a first side surface of the capacitor body 110, and a second side surface thereof opposite to the first side surface. Moreover, the first and second outer electrodes 131 and 132, may extend to the top and bottom surfaces of the capacitor body 110. In this case, the side, top and bottom surfaces are defined with reference to FIG. 1 for the ease of description.

According to this embodiment, the first and second outer electrodes 131 and 132 may be formed using electroless plating by which a pitch therebetween can be controlled with high precision. In this case, the process characteristics of the electroless plating enable the first and second outer electrodes 131 and 132 to be formed only in an active region (expressed as width t1 in FIG. 1). Here, the active region t1 refers to a region in which capacitance is formed by first and second inner electrodes 121 and 122 in the capacitor body 110. FIG. 1 illustrates a 2-terminal structure including one outer electrode on each of the first and second side surfaces. The number of terminals is not limited to the illustration or description, and a multi-terminal structure such as a 3-terminal, 4-terminal or 8-terminal structure may be employed for the present invention.

Referring to FIGS. 2 and 3, a plurality of inner electrodes 121 and 122 (hereinafter, 'first and second inner electrodes' respectively) are interleaved with the dielectric layers, and may be stacked in one direction (hereinafter, 'stacked direction'). That is, as indicated in FIG. 3 by arrows corresponding to the stacked direction, inner electrodes 121, 122 and 123a are stacked from the lower part toward the upper part of the capacitor body 110. In this case, the first and second inner electrodes 121 and 122 are electrically connected to the outer electrodes of like polarity, that is, to the first and second outer electrodes 131 and 132, respectively. To this end, the first inner electrode 121 may include an electrode plate P1 forming capacitance and a lead R1 extending from an extrusion electrode, that is, the electrode plate P1, and the second inner electrode 122 may also include an electrode plate P2 forming capacitance and a lead R2 extending from the electrode plate P2. For stable electrical connections, as shown in FIG. 3, the respective leads R1 and R2 may be electrically connected to the first and second outer electrodes 131 and 132 in three surfaces, that is, in the side, top and bottom surfaces of the capacitor body 110. However, the configuration of the leads R1 and R2 is not limited to the description, and a variety of configurations may be used for an electrical connection between the electrode plates P1 and P2 and the first and second outer electrodes 131 and 132 within the range of configurations that preclude capacitance.

Third inner electrodes 123a and 123b are interposed between the first and second inner electrodes 121 and 122. The third inner electrodes 123a and 123b do not contribute to forming of capacitance, and each has a conductive pattern having an identical shape to that of at least one of the leads R1 and R2 of the first and second inner electrodes 121 and 122. In detail, for example, one third inner electrode 123a of two third inner electrodes 123a and 123b adjacent to the first inner electrode 121 has a conductive pattern having the same shape as that of the lead of the first inner electrode 121, and the other third inner electrode 123b has a conductive pattern having the same shape as that of the lead R2 of the second inner electrode 122b. In this case, these third inner electrodes 123a and 123b may not overlap the electrode plates P1 and P2 of the first and second inner electrodes 121 and 122, in order to prevent the third inner electrodes 123a and 123b from contributing to the formation of capacitance. A stack of four inner electrodes having a defined order, that is, the first inner electrode 121, the third inner electrode 123a, the second inner electrode 122 and the third inner electrode 123b, constitutes a single block, and this type of block may be repetitively stacked within the capacitor body 110.

The above-described disposition of inner electrodes may be generalized as follows: at least one third inner electrode 123a of third inner electrodes adjacent to a first inner electrode 121 has a conductive pattern having the same shape as that of a lead R1 of the first inner electrode 121, and at least one third inner electrode 123b of third inner electrodes adjacent to a second inner electrode 122 has a conductive pattern having the same shape as that of a lead R2 of the second inner electrode 122. Namely, even if somewhat different from the illustration of FIGS. 2 and 3, any configuration including conductive patterns placed adjacent to the first and second inner electrodes 121 and 122 and having conductive patterns having the same shapes as the leads R1 and R2 of the first and second inner electrodes 121 and 122, respectively, would be understood as falling within the spirit of the present invention.

Figure 4:
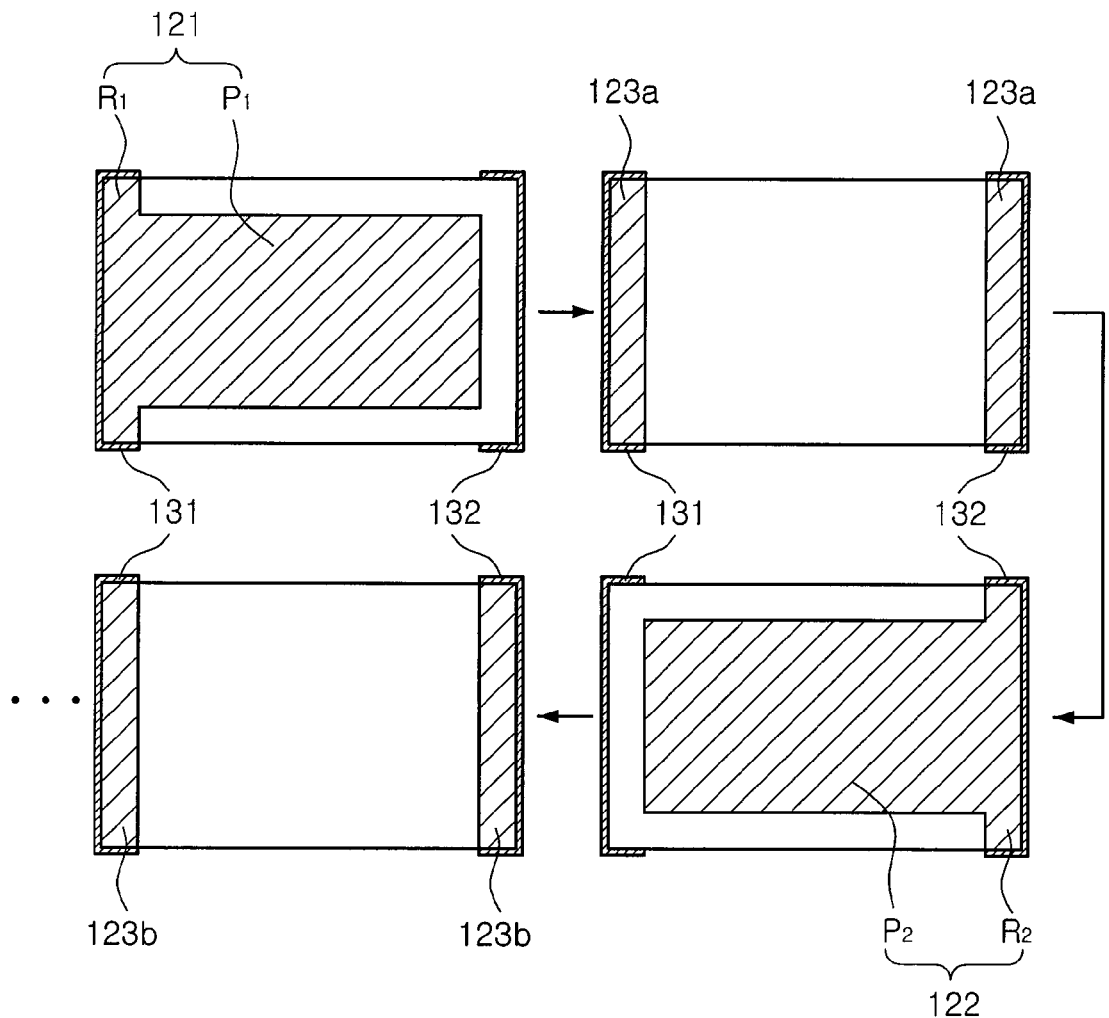
FIGS. 4 and 5 are schematic cross-sectional views illustrating the modified configurations of third inner electrodes.
Figure 5:
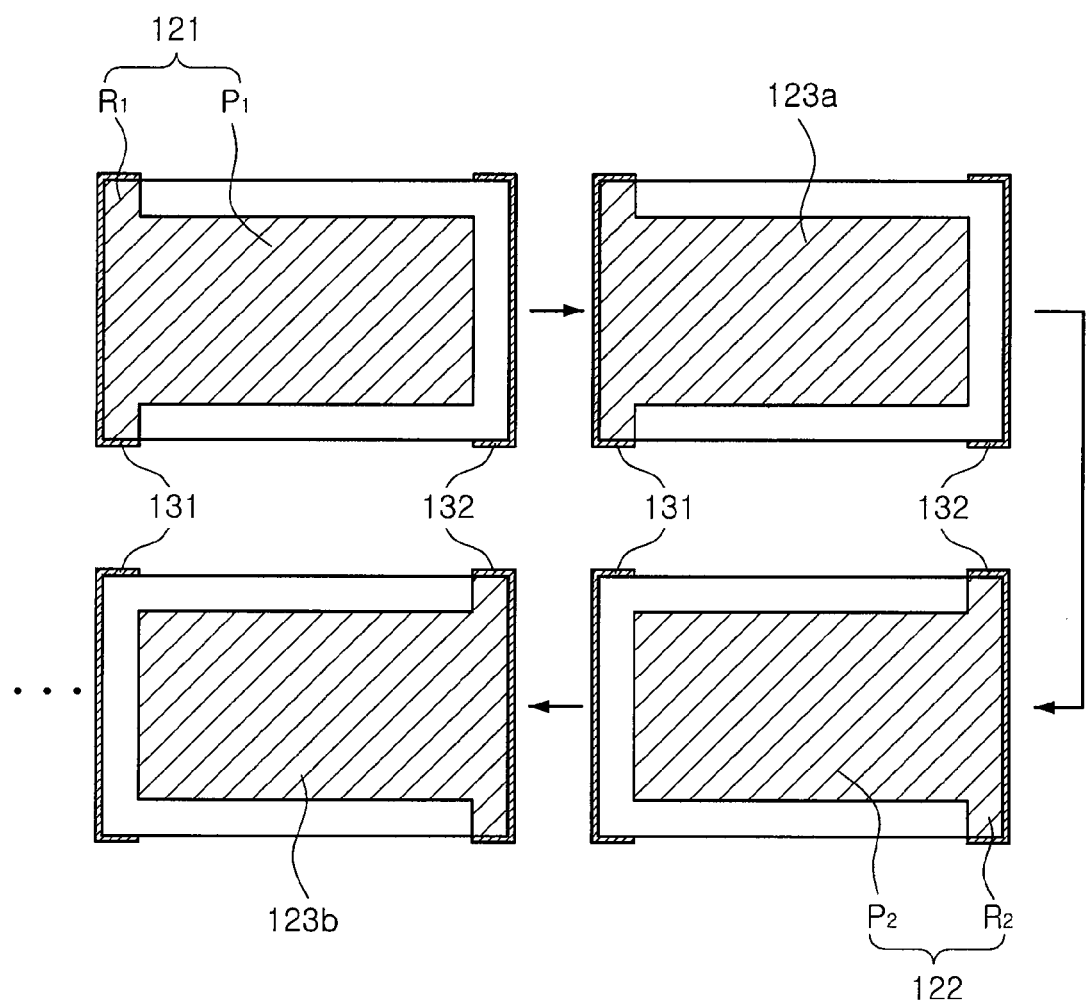

Provided that the above described conditions are satisfied, the configuration of the third inner electrodes 123a and 123b may be variously implemented. FIGS. 4 and 5 are schematic cross-sectional views illustrating modified configurations of third inner electrodes. First, as shown in FIG. 4, third inner electrodes 123a and 123b each may have both conductive patterns having the same shapes as the leads R1 and R2 of the first and second inner electrodes 121 and 122. Thus, the third inner electrodes 123a and 123b may have the same shape. As another example, as shown in FIG. 5, one third inner electrode 123a of two third inner electrodes adjacent to the first inner electrode 121 may have the same shape as the first inner electrode 121, and the other third inner electrode 123b may have the same shape as the second inner electrode 122. Consequently, this configuration of FIG. 5 corresponds to a stack having a defined order of two successive first inner electrodes 121 and two successive second inner electrodes 122.

Even if the third inner electrodes 123a and 123b each have a portion that has the same shape as the electrode plate, this is merely a structure where inner electrodes of like polarity, for example, the first inner electrode 121 and the third inner electrode 123a are successively stacked, and therefore one of those successive inner electrodes of like polarity becomes a dummy electrode, which does not contribute to additional capacitance formation. In this embodiment, two successive first inner electrodes 121 and two successive second inner electrodes 122 are stacked in that order; however, inner electrodes of like polarity may be successively stacked in a groups of three or more, and the number thereof may be varied to properly address a user's need.

Figure 6:
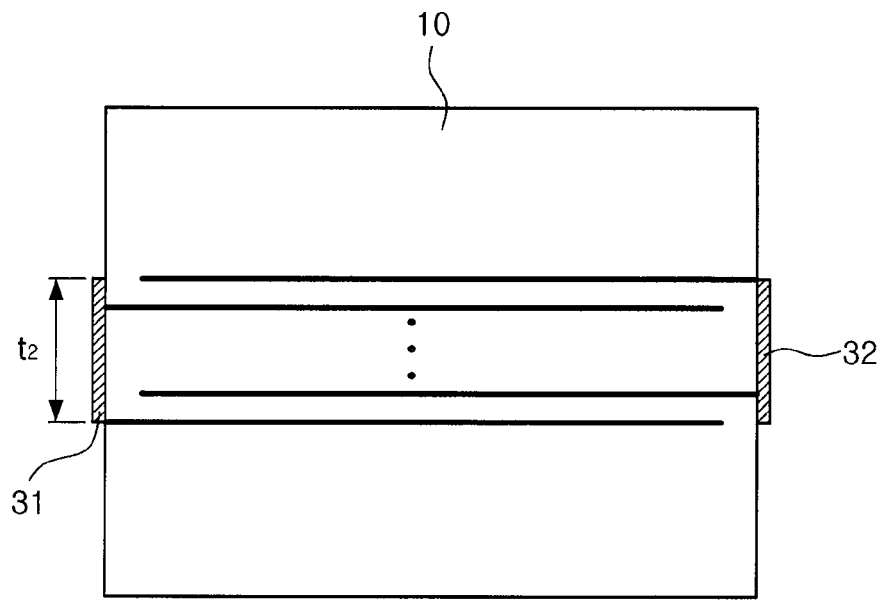
FIG. 6 is a schematic cross-sectional view illustrating a multilayer chip capacitor according to the related art.

As compared to a related-art structure depicted in FIG. 6, there will be described the advantages of the conditions regarding inner electrodes as described above with respect to FIGS. 3 through 5, namely, the configuration in which conductive patterns having the same shapes as the leads R1 and R2 of the first and second inner electrodes 121 and 122 are placed at the locations adjacent to the first and second inner electrodes 121 and 122, respectively. A multilayer chip capacitor according to the related art includes first and second outer electrodes 31 and 32 on the outer part of capacitor body 10, and first and second inner electrodes 21 and 22 alternated within the capacitor body 10. This structure of the related art, as compared to the embodiment of FIG. 2, may be understood as not including the third inner electrodes 123a and 123b. In this case, the width t2 of an active region indicated in FIG. 6 is smaller than the width t1 of the active region in FIG. 2, and this difference is due to the presence of third inner electrodes 123a and 123b.

As one method of reducing a pitch between outer electrodes to lower ESL, electroless plating may be used to apply outer electrodes. In forming outer electrodes using electroless plating, a conductive material is attached to leads of inner electrodes exposed outside a capacitor body to thereby form outer electrodes. For this reason, the further the distance between leads exposed to the outside, namely, the distance between inner electrodes is, the harder the formation of outer electrodes becomes. In some cases, outer electrode patterns may not be formed in a desired region. In this regard, when electroless plating is used to form outer electrodes, the distance between inner electrodes, namely, the distance between leads needs to be maintained within a predetermined distance.

The condition regarding the distance between leads for electroless plating may be negligible in a high-capacitance capacitor with a large number of inner electrodes. However, in the case of a low-capacitance capacitor with a small number of inner electrodes, if the distance condition between leads is satisfied, an active region is reduced causing ESL to increase, or, in contrast, if the active region is increased, this makes it difficult to form outer electrodes using electroless plating. This is worsened when a multilayer chip capacitor is mounted vertically on a circuit board or the like. Here, the term "vertical mounting" refers to the case in which inner electrodes are disposed vertically on the mounting surface of a circuit board. Thus, the term 'vertical mounting' may imply that inner electrodes are stacked vertically.

Figure 7:
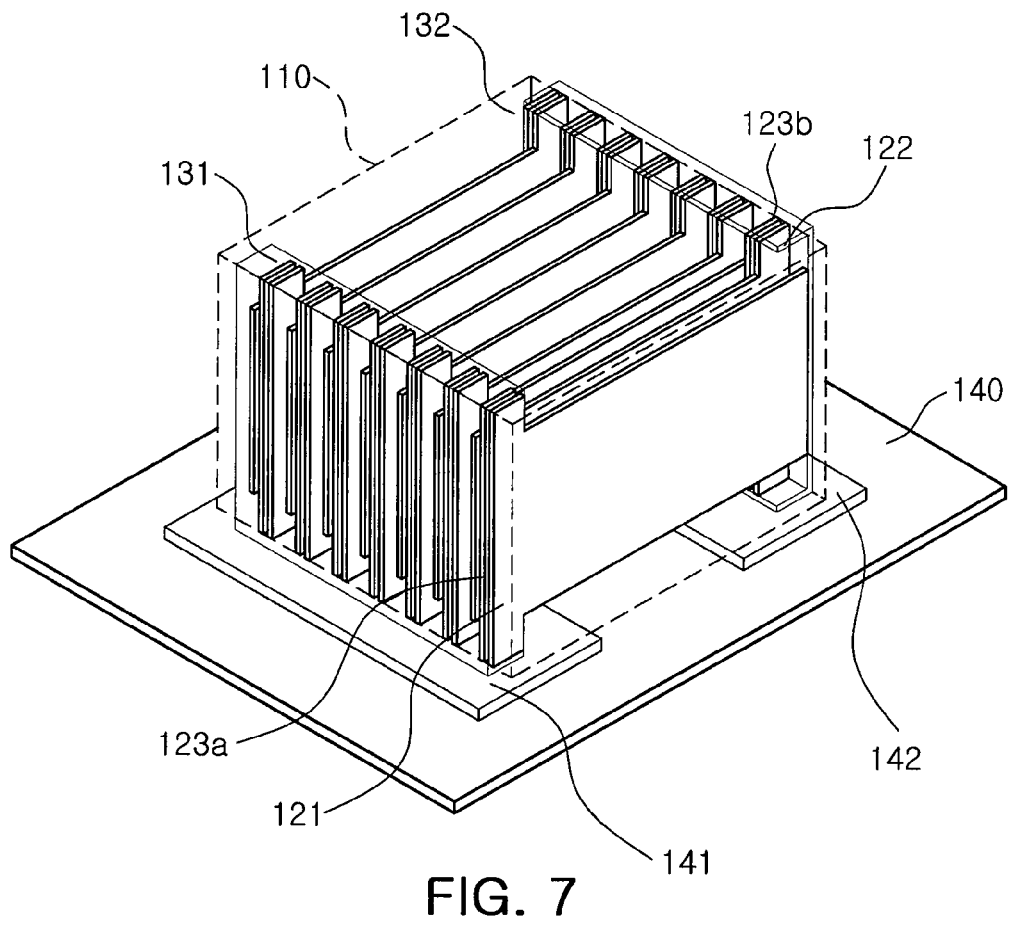
FIG. 7 is a schematic perspective view illustrating a circuit board device according to an exemplary embodiment of the present invention, illustrating the multilayer chip capacitor of FIG. 1 mounted on a circuit board.

FIG. 7 is a schematic perspective view illustrating a circuit device board according to an exemplary embodiment of the present invention. In FIG. 7, the multilayer chip capacitor of FIG. 1 is mounted on a circuit board. Referring to FIG. 7, a circuit board device of this embodiment has a structure in which the multilayer chip capacitor described with reference to FIG. 1 is mounted vertically on a circuit board 140. Here, this vertical mounting of the multilayer chip capacitor means that the first inner electrodes 121, the second inner electrodes 122 and the third inner electrodes 123a and 123b in the capacitor body 110 are disposed vertically with respect to the mounting surface of the circuit board 140. The first and second outer electrodes 131 and 132 disposed on one surface of the capacitor body 110 are respectively connected to first and second electrode pads 141 and 142 disposed on the mounting surface of the circuit board 140. In this case, the multilayer chip capacitor 100 has a horizontally symmetrical shape. Thus, when the multilayer chip capacitor 100 is mounted on the circuit board 140, any one of the top and bottom surfaces of the capacitor body 110 may be a mounting surface. Accordingly, there is no need to decide which surface is to be the mounting surface.

As for the vertical mounting, the inner electrodes 121, 122, 123a and 123b are disposed vertically on the mounting surface, so that current can flow directly to the inner electrodes 121, 122, 123a and 123b through the thickness of the outer electrodes 131 and 132 from the electrode pads 141 and 142 of the circuit board 140. Accordingly, ESL can be lowered further than the case in which inner electrodes are disposed parallel to the circuit board 140. Notably, considering that the vertical mounting method allows the width (t1 in FIG. 2 and t2 in FIG. 6) of the active region where inner electrodes are present to serve as the width of a current path, ESL can be lowered by increasing the width of the active region as proposed in this embodiment. That is, if the width t2 of the active region is as small as it is in the related art capacitor illustrated in FIG. 6, the width of a current path is also small, which may increase ESL. However, in the case of the capacitor proposed by the present invention (see FIG. 2), the width t1 of the active region is greater than that of FIG. 6, while the capacitance and the distance between inner electrodes are maintained at the same or similar level as the structure of FIG. 6. Consequently, this embodiment ensures a sufficiently large width of a current path while still forming outer electrodes using electroless plating, thereby lowering the ESL of the multilayer chip capacitor.

Figure 8:
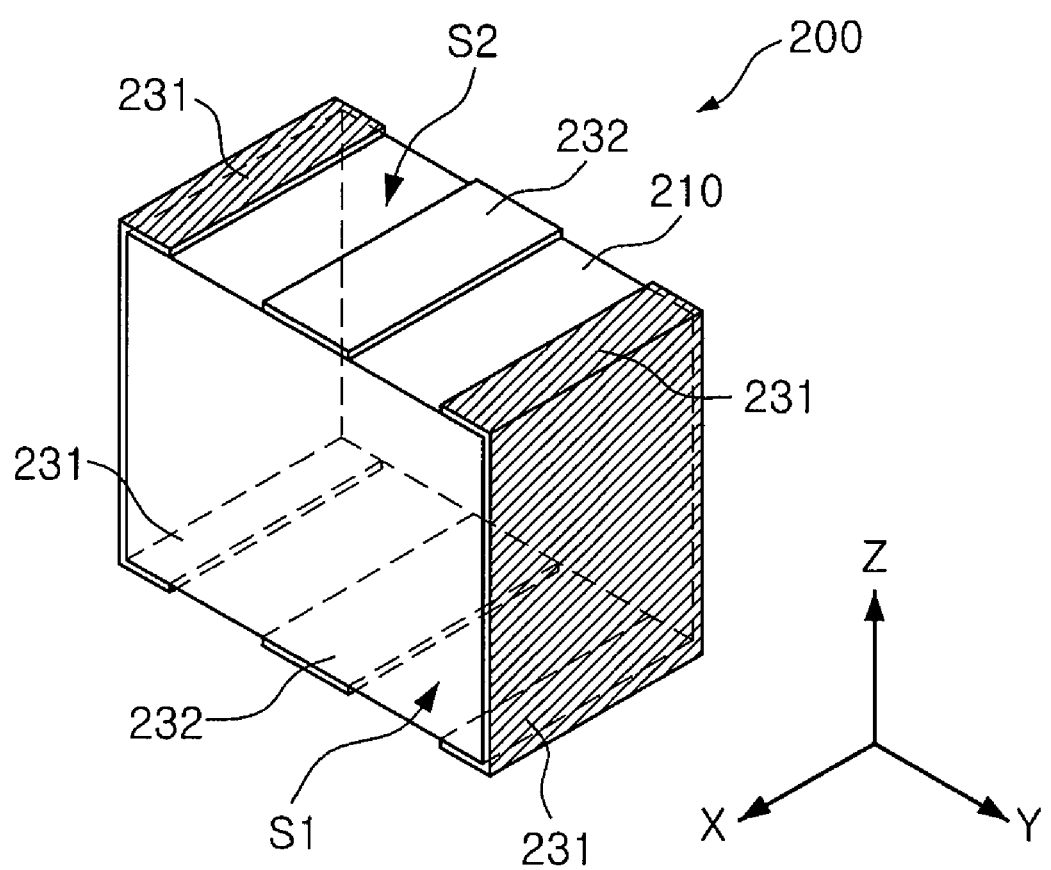
FIG. 8 is a schematic perspective view illustrating the exterior of a multilayer chip capacitor according to another exemplary embodiment of the present invention.

FIG. 8 is a schematic perspective view illustrating the exterior of a multilayer chip capacitor according to another exemplary embodiment of the present invention, and FIGS. 9 through 12 are schematic cross-sectional views illustrating examples of inner electrodes applicable to the multilayer chip capacitor of FIG. 8.

Referring to FIG. 8, a multilayer chip capacitor 200 according to this embodiment includes a capacitor body 210, and first and second outer electrodes 231 and 232 formed on one surface S1 of the capacitor body 210. The multilayer chip capacitor 200 may also include first and second outer electrodes 231 and 232 formed on the other surface S2 opposite to the one surface S1. With reference to FIG. 8, the one surface S1 and the opposite surface S2 will be referred to as a bottom surface S1 and a top surface S2, and surfaces between the bottom and top surfaces S1 and S2 will be referred to as side surfaces. The first outer electrodes 231 on the bottom and top surfaces S1 and S2 may be connected together by extending to the side surface, and the second outer electrodes 232 are disposed between the two first outer electrodes 231. In detail, the first and second outer electrodes 231 and 232 are spaced apart from one another along a direction perpendicular to a stacked direction of first and second inner electrodes (see 211 and 222 of FIG. 9), and each are formed in the stacked direction.

By having those outer electrodes as in this embodiment, the bottom surface S1 or the top surface S2 of the multilayer chip capacitor 200 may serve as a mounting surface, which is suitable for a vertical mounting method. Also, the first and second outer electrodes 231 and 232 are formed on the same surface according to this embodiment, thereby facilitating the use of the process of electrode plating for precise pitch control to apply the first and second outer electrodes 231 and 232.

Figure 9:
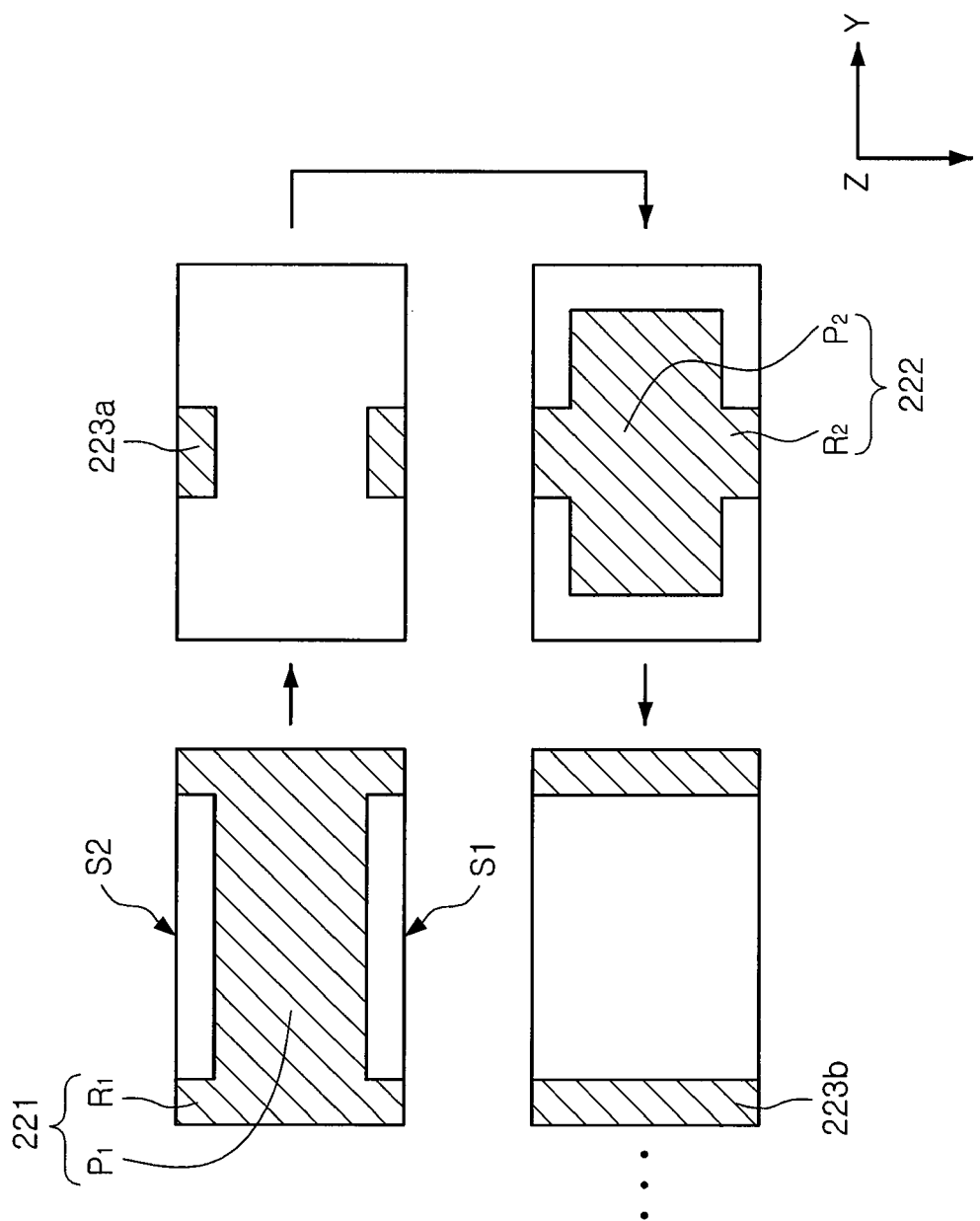
FIGS. 9 through 11 are schematic cross-sectional views illustrating examples of inner electrodes applicable to the multilayer chip capacitor of FIG. 8.

Referring to FIG. 9, first and second inner electrodes 221 and 222 are interleaved with dielectric layers in the capacitor body 210, and are electrically connected to outer electrodes of like polarity, namely, to the first and second outer electrodes 231 and 232, respectively. To this end, the first inner electrode 221 may include an electrode plate P1 forming capacitance and a lead R1 corresponding to an extrusion electrode extending from the electrode plate P1, and the second inner electrode 221 may also include an electrode plate P2 forming capacitance and a lead R2 corresponding to an extrusion electrode extending from the electrode plate P2. As one example of the configuration of such first and second inner electrodes 221 and 222, the first inner electrode 221 may have an H-shape, and the second inner electrode 222 may have a cross (+) shape.

As in the previous embodiment, third inner electrodes 223a and 223b are disposed between the first and second inner electrodes 221 and 222 in order to ensure a stable electroless plating process and a sufficient width of an active region. The third inner electrodes 223a and 223b do not contribute to capacitance formation, and each has a conductive pattern having the same shape as that of at least one of the leads R1 and R2 of the first and second inner electrodes 221 and 222. As a concrete example, one third inner electrode 223a of two third inner electrodes adjacent to the first inner electrode 221 has a conductive pattern having the same shape as that of the lead R1 of the first inner electrode 221, and the other third inner electrode 223b has a conductive pattern having the same shape as that of the lead R2 of the second inner electrode 222. In order not to be involved in capacitance formation, the third inner electrodes 223a and 223b may not overlap the electrode plates P1 and P2 of the first and second inner electrodes 221 and 222 when viewed in the stacked direction.

Figure 10:
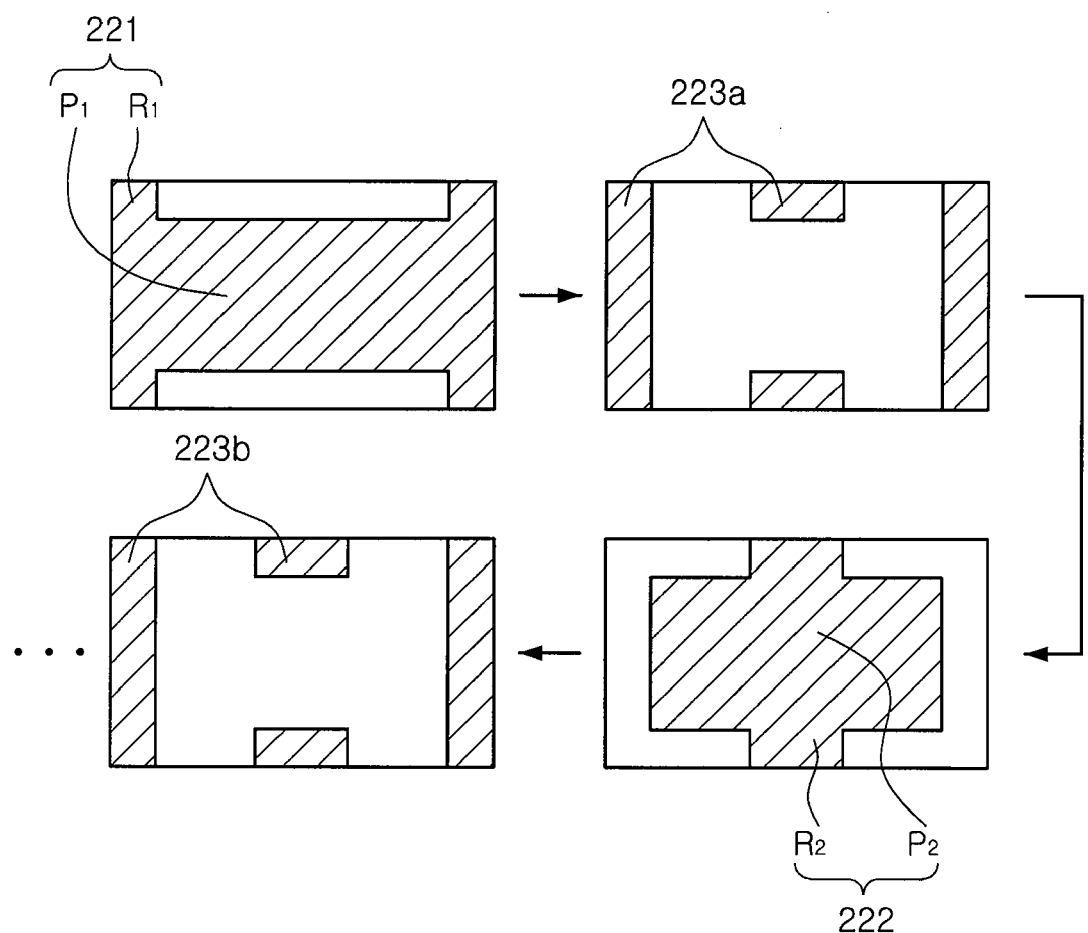

The above-described disposition of inner electrodes may be generalized as follows: at least one third inner electrode 223a of third inner electrodes adjacent to a first inner electrode 221 has a conductive pattern having the same shape as that of a lead R1 of the first inner electrode 221, and at least one third inner electrode 223b of third inner electrodes adjacent to a second inner electrode 222 has a conductive pattern having the same shape as that of a lead R2 of the second inner electrode 222. Provided that the above described conditions are satisfied, the configuration of the third inner electrodes 223a and 223b may be variously implemented. That is, as shown in FIG. 10, third inner electrodes 223a and 223b each may have both conductive patterns having the same shapes as the leads R1 and R2 of the first and second inner electrodes 221 and 222. Thus, the third inner electrodes 223a and 223b may have the same shape.

Figure 11:
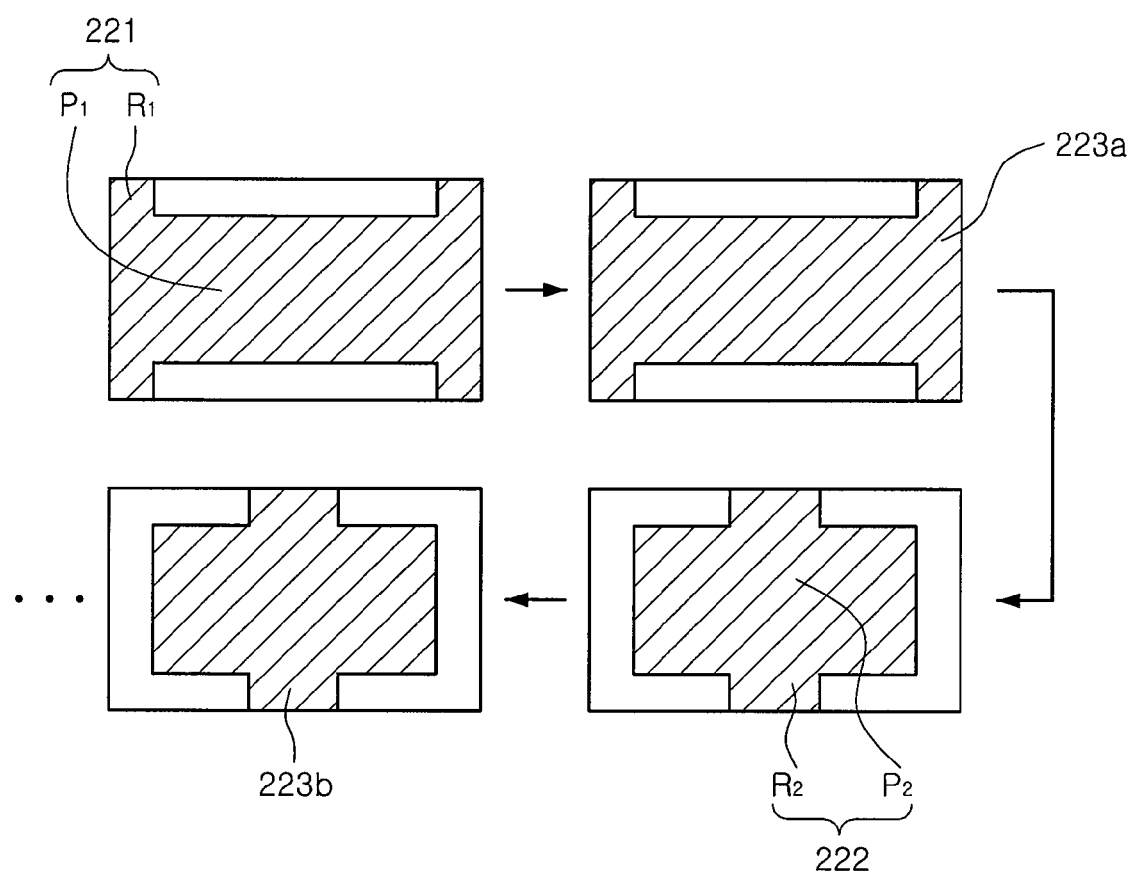

As another example, as shown in FIG. 11, one third inner electrode 223a of two third inner electrodes adjacent to the first inner electrode 221 may have the same shape as the first inner electrode 221, and the other third inner electrode 223b may have the same shape as the second inner electrode 222. Consequently, this configuration of FIG. 11 corresponds to a stack having a defined order of two successive first inner electrodes 221 and two successive second inner electrodes 222. Even if the third inner electrodes 223a and 223b each have a portion that has the same shape as the electrode plate, this is merely a structure where inner electrodes of like polarity, for example, the first inner electrode 221 and the third inner electrode 223a are successively stacked, and therefore one of those successive inner electrodes of like polarity becomes a dummy electrode, which does not contribute to additional capacitance formation. In this embodiment, two successive first inner electrodes 221 and two successive second inner electrodes 222 are stacked in that order; however, inner electrodes of like polarity may be successively stacked in a groups of three or more, and the number thereof may be varied to properly address a user's need.

Figure 12:
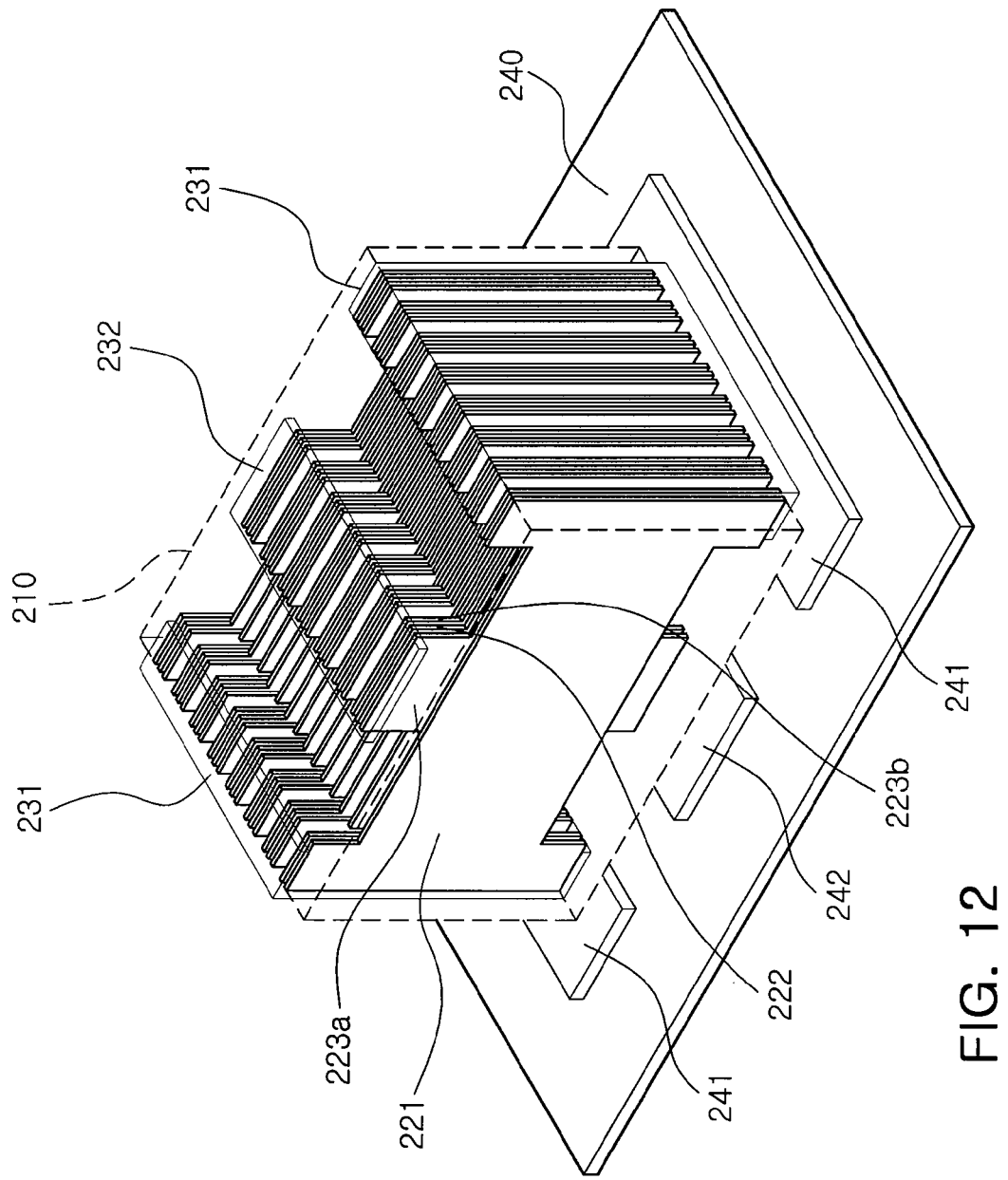
FIG. 12 is a schematic perspective view illustrating a circuit board device according to another exemplary embodiment of the present invention, showing that the multilayer chip capacitor of FIG. 8 is mounted on a circuit board.

FIG. 12 is a schematic perspective view illustrating a circuit board device according to an exemplary embodiment of the present invention. In detail, FIG. 12 shows the multilayer chip capacitor FIG. 8 is mounted on a circuit board. As in the previous embodiment, in the circuit board device according to this embodiment, the first inner electrodes 221, the second inner electrodes 222 and the third inner electrodes 223a and 223b within the capacitor body 210 are disposed vertically on the mounting surface of a circuit board 240. The first outer electrodes 231 and 232 formed on one surface of the capacitor body 210 are connected to first and second electrode pads 241 and 242 formed on the mounting surface of the circuit board 240, respectively. In this case, the multilayer chip capacitor 200 has a horizontally symmetrical shape, so that any one of the bottom and top surfaces of the capacitor body 210 may be a mounting surface. Thus, there is no need to consider which surface should be mounted on the mounting surface of the circuit board 240.

Figure 13:
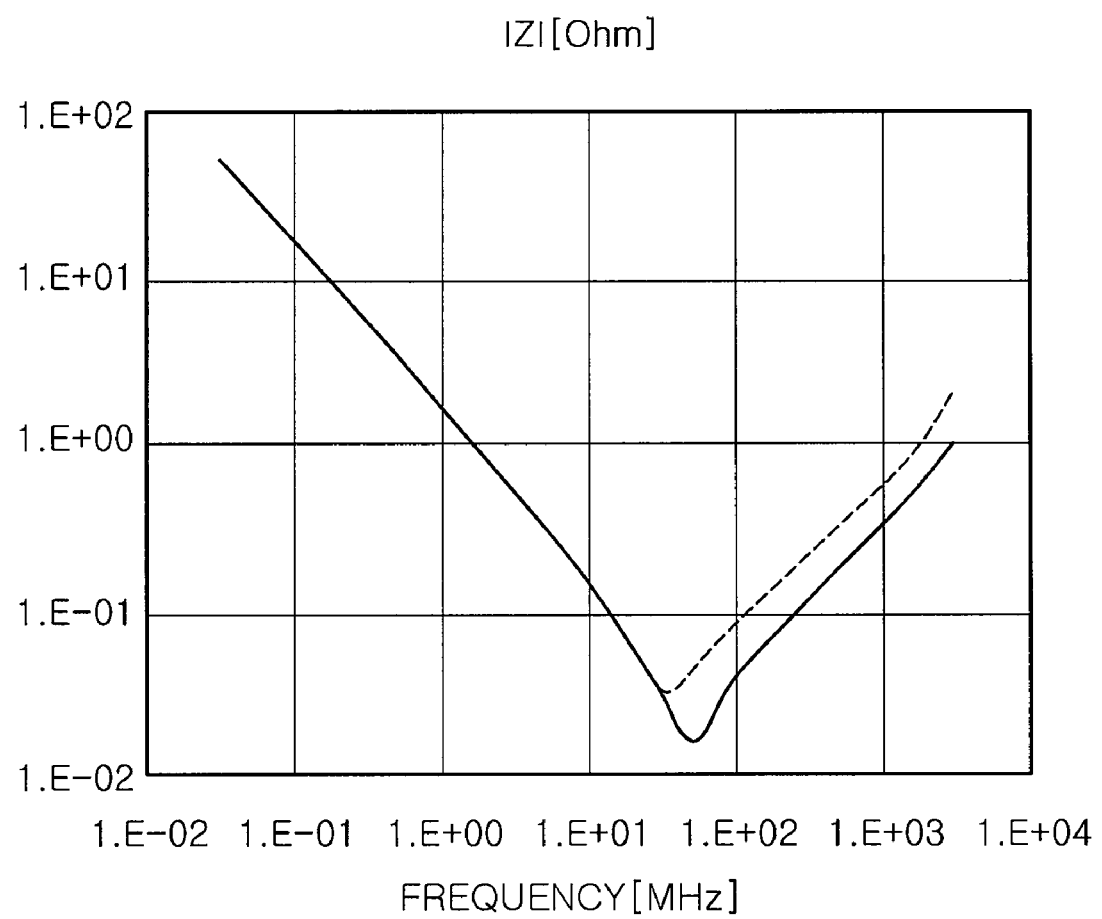
FIG. 13 is an impedance graph showing an ESL reduction effect obtained by using third inner electrodes according to the present invention.

FIG. 13 is an impedance graph showing an ESL reduction effect obtained by using third inner electrodes according to the present invention. In FIG. 13, a solid curve represents impedance measured in a circuit board device having a structure depicted in FIG. 12, and a dotted curve represents impedance measured in a structure (not shown) having a smaller width of an active region than in the multilayer chip capacitor depicted in FIG. 8 by including only first and second inner electrodes, namely, excluding third inner electrodes from the capacitor of FIG. 8. Referring to FIG. 13, when the multilayer chip capacitor having the active region with an increased width according to the present invention is used, it can be seen that ESL is lowered at high frequencies. Therefore, when a proposed multilayer chip capacitor according to the present invention is used as a decoupling capacitor in a power distribution network of a micro processor unit (MPU), high-frequency noise of DC voltage may be effectively suppressed.

Figure 14:
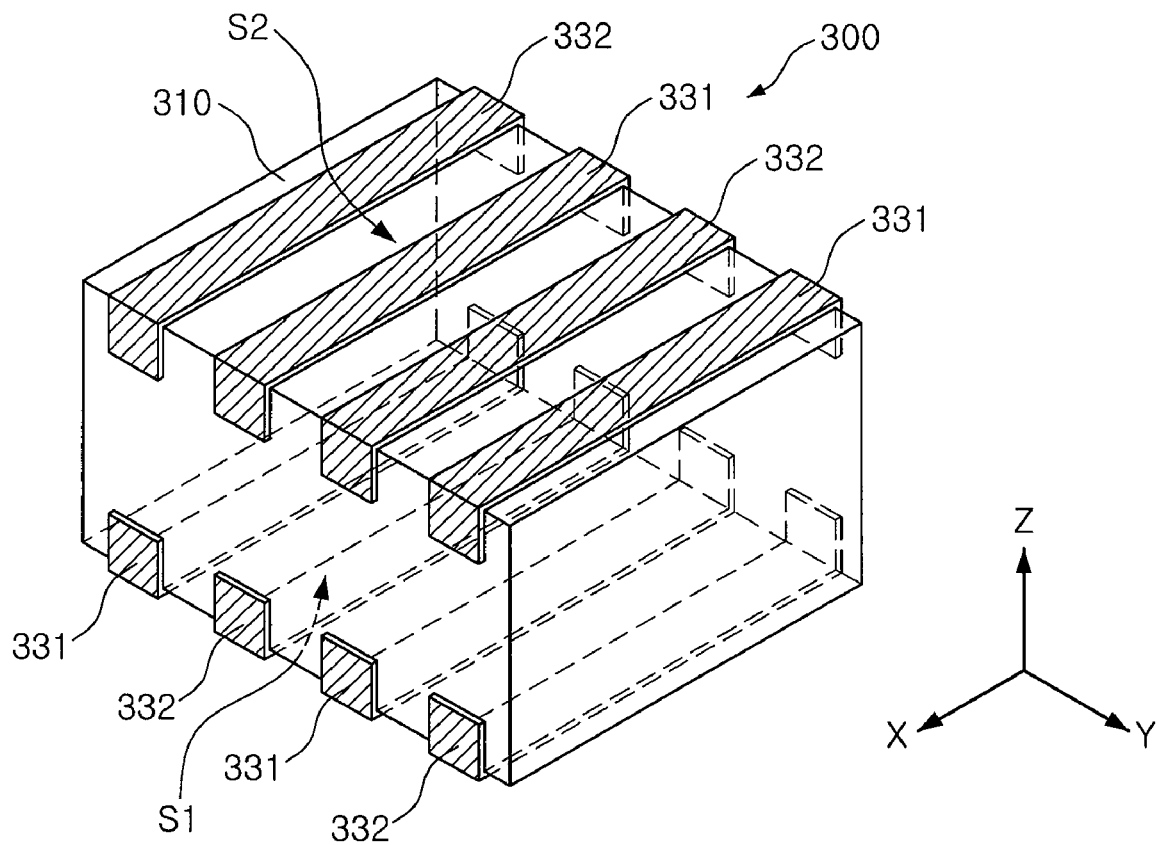
FIG. 14 is a schematic perspective view illustrating the exterior of a multilayer chip capacitor according to another exemplary embodiment of the present invention.

As described above, the number of terminals of a multilayer chip capacitor proposed according to the present invention may be increased. Hereinafter, a 4-terminal structure will be described as an example. FIG. 14 is a schematic perspective view illustrating the exterior of a multilayer chip capacitor according to another exemplary embodiment of the present invention, and FIGS. 15 and 16 are schematic cross-sectional views illustrating examples of inner electrodes applicable to the multilayer chip capacitor of FIG. 14.

Referring to FIG. 14, a multilayer chip capacitor 300 according to this embodiment includes a capacitor body 310, and four first and second outer electrodes 331 and 332 disposed on each of one and opposite surfaces S1 and S2 of the capacitor body 310. The first and second outer electrodes 331 and 332 are spaced apart from each other along a direction perpendicular to the stacked direction of first and second inner electrodes (see 321 and 322 of FIG. 14), and each are arranged along the stacked direction. As shown in FIG. 14, the second outer electrodes 332 may be formed at the locations facing the first outer electrodes 331. In this case, the totality of eight outer electrodes 331 and 332 are formed on the capacitor body 310, but this may be considered to be a 4-terminal capacitor considering that one surface provided with the outer electrodes 331 and 332 is mounted on a circuit board. Due to the above configuration of the outer electrodes of this embodiment, any one of the bottom and top surfaces S1 and S2 of the multilayer chip capacitor 300 may serve as a mounting surface so that the multilayer chip capacitor 300 is suitable for a vertical mounting method. According to this embodiment, the first and second outer electrodes 331 and 332 are formed on the same surface, so that electrode plating enabling precise pitch control can be more easily used to apply the first and second outer electrodes 331 and 332.

Figure 15:
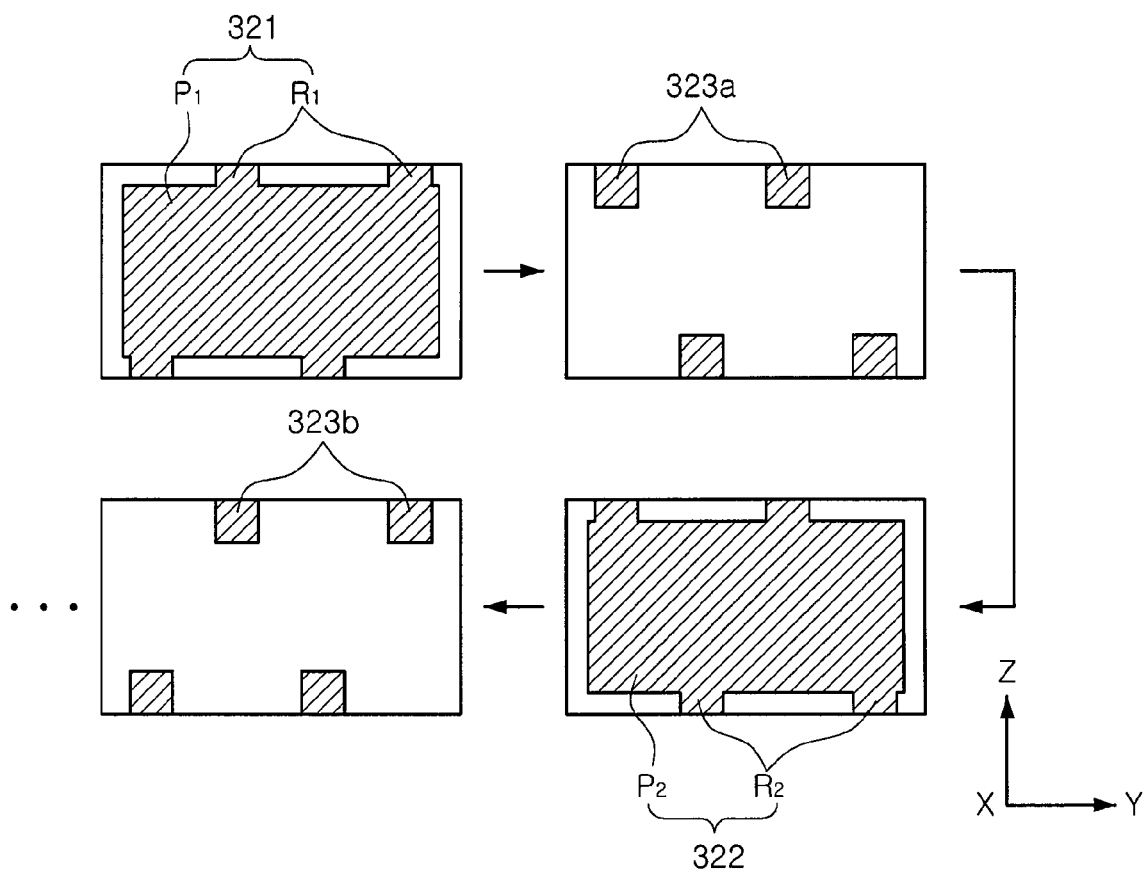
FIGS. 15 and 16 are schematic cross-sectional views illustrating examples of inner electrodes applicable to the multilayer chip capacitor of FIG. 14.
Figure 16:
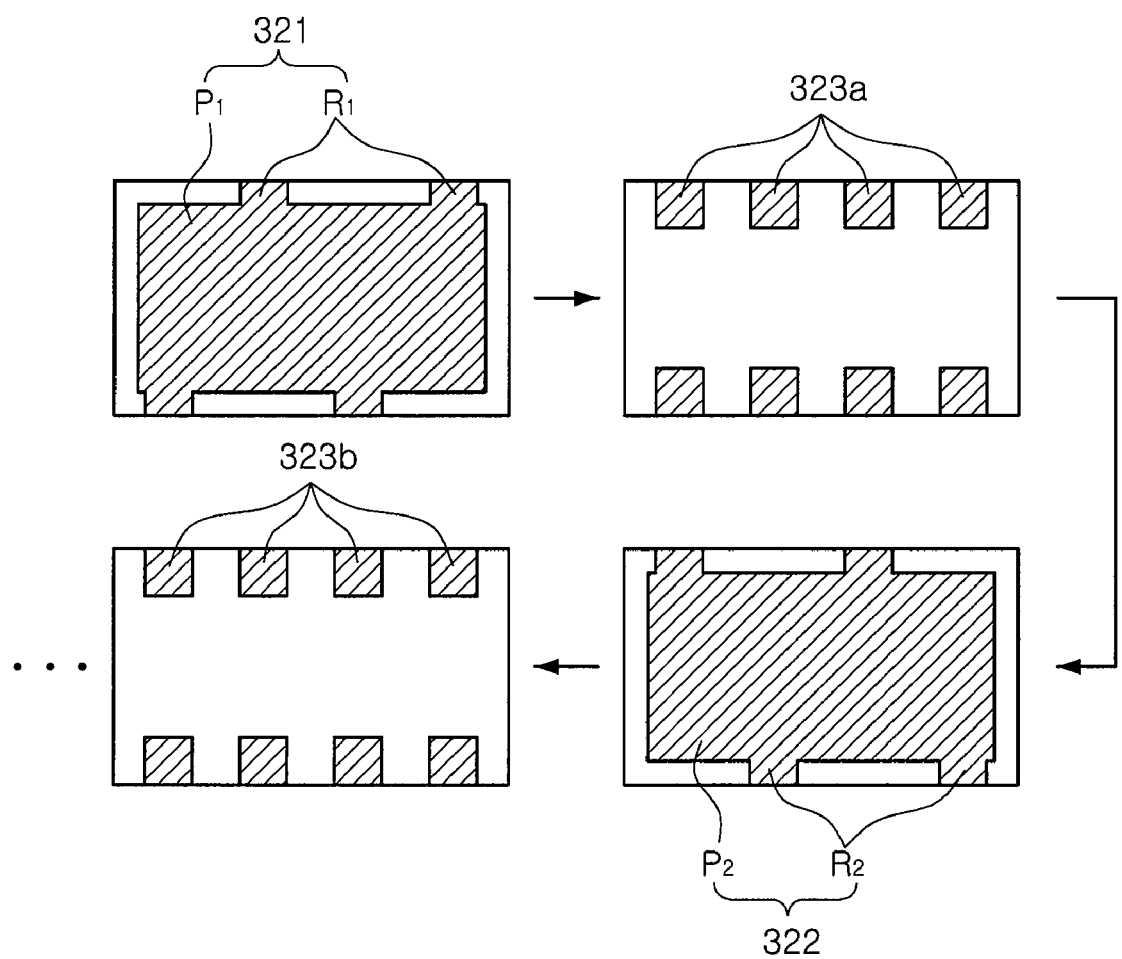

Referring to FIG. 15, first and second inner electrodes 321 and 322 are interleaved with dielectric layers in the capacitor body 310. The first and second inner electrodes 321 and 322 are electrically connected to outer electrodes of like polarity, that is, the first and second outer electrodes 311 and 322 (not shown in FIG. 15), respectively. To this end, the first inner electrode 321 may include an electrode plate P1 forming capacitance, and a lead R1 corresponding to an extrusion electrode extending from the electrode plate P1, and the second inner electrode 322 may include an electrode plate P2 forming capacitance, and a lead R2 corresponding to an extrusion electrode extending from the electrode plate P2. In the structure depicted in FIG. 15, the first inner electrode 321 includes four leads R1 having a smaller width than the electrode plate P1, and the second inner electrode 322 also includes four leads R2 having a smaller width than the electrode plate P2. In detail, from each of the first and second inner electrodes 321 and 322, two leads out of four leads may extrude toward the bottom surface S1, and the other leads may extrude towards the top surface S2.

As in the previous embodiment, third inner electrodes 323a and 323b are disposed between the first and second inner electrodes 321 and 322 in order to ensure a stable electroless plating process and sufficient width of an active region. The third inner electrodes 323a and 323b do not contribute to capacitance formation, and each has a conductive pattern having the same shape as that of at least one of the leads R1 and R2 of the first and second inner electrodes 321 and 322. As a concrete example, one third inner electrode 323a of two third inner electrodes adjacent to the first inner electrode 321 has a conductive pattern having the same shape as that of the lead R1 of the first inner electrode 321, and the other third inner electrode 323b has a conductive pattern having the same shape as that of the lead R2 of the second inner electrode 322. In order not to be involved in capacitance formation, the third inner electrodes 323a and 323b may not overlap the electrode plates P1 and P2 of the first and second inner electrodes 321 and 322 when viewed in the stacked direction.

In addition, as shown in FIG. 16, the third inner electrodes 323a and 323b each may have both conductive patterns having the same shapes as the leads R1 and R2 of the first and second inner electrodes 321 and 322. Thus, the third inner electrodes 323a and 323b may have the same shape. As in the previous embodiment, although not shown, one third inner electrodes 323a of two third inner electrodes adjacent to the first inner electrode 321 may have the same shape as the first inner electrode 321, and the other third inner electrode 323b may have the same shape as the second inner electrode 322.

As set forth above, according to exemplary embodiments of the invention, there are provided a multilayer chip capacitor capable of allowing reliability to be enhanced in the process of forming outer electrodes using electroless plating and of lowering ESL by ensuring a sufficient width of an active region, and a circuit board device including the same. When the multilayer chip capacitor proposed according to the present invention is used as a decoupling capacitor in a power distribution network of an MPU, high-frequency noise of DC voltage can be effectively suppressed.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer chip capacitor comprising:
a capacitor body including a plurality of dielectric layers that are stacked;
first and second outer electrodes formed on an outer surface of the capacitor body and having opposite polarity;
first and second inner electrodes opposing each other, interleaved with the dielectric layers in the capacitor body, and each including an electrode plate forming capacitance and a lead extending from the electrode plate, the lead of the first inner electrode and the lead of the second electrode being respectively connected to the first and second outer electrodes; and
third inner electrodes interposed between the first and second inner electrodes,
wherein at least one of the third inner electrodes adjacent to the first inner electrode includes a conductive pattern having the same shape as the lead of the first inner electrode and is connected to the first outer electrode, and at least one of the third inner electrodes adjacent to the second inner electrode includes a conductive pattern having the same shape as the lead of the second inner electrode and is connected to the second outer electrode.

2. The multilayer chip capacitor of claim 1, wherein the first inner electrode, the third inner electrode including the conductive pattern having the same shape as the lead of the first inner electrode, the second inner electrode, and the third inner electrode including the conductive pattern having the same shape as the lead of the second inner electrode constitute a block, and the block is repetitively stacked in the capacitor body.

3. The multilayer chip capacitor of claim 1, wherein at least one of the third inner electrodes includes conductive patterns having the same shapes as the lead of the first inner electrode and the lead of the second inner electrode.

4. The multilayer chip capacitor of claim 1, wherein the third inner electrodes are configured to preclude capacitance formation with the first and second inner electrodes.

5. The multilayer chip capacitor of claim 4, wherein the third inner electrodes do not overlap the electrode plate of the first inner electrode and the electrode plate of the second inner electrode in a stacked direction in which the plurality of dielectric layers are stacked.

6. The multilayer chip capacitor of claim 1, wherein the lead of the first inner electrode is connected with the conductive pattern of the third inner electrode having the same shape as the lead of the first inner electrode by the first outer electrode.

7. The multilayer chip capacitor of claim 1, wherein the lead of the second inner electrode is connected with the conductive pattern of the third inner electrode having the same shape as the lead of the second inner electrode by the second outer electrode.

8. The multilayer chip capacitor of claim 1, wherein the first and second outer electrodes are formed by electroless plating.

9. The multilayer chip capacitor of claim 1, wherein when a region in which capacitance is formed by the first and second inner electrodes in the capacitor body is defined as an active region, and the first and second outer electrodes are formed only in the active region.

10. The multilayer chip capacitor of claim 1, wherein at least one of the third inner electrodes adjacent to the first inner electrode includes a conductive pattern having the same shape as the first inner electrode, and at least one of the third inner electrodes adjacent to the second inner electrode includes a conductive pattern having the same shape as the second inner electrode.

11. The multilayer chip capacitor of claim 1, wherein the first and second outer electrodes are formed on opposing side surfaces of the capacitor body, respectively, and extend to top and bottom surfaces of the capacitor body.

12. The multilayer chip capacitor of claim 11, wherein the leads of the first and second inner electrodes respectively contact the first and second outer electrodes in the side, top and bottom surfaces of the capacitor body.

13. The multilayer chip capacitor of claim 11, wherein the first and second inner electrodes are disposed vertically on the top and bottom surfaces of the capacitor body.

14. The multilayer chip capacitor of claim 1, wherein the first and second outer electrodes are formed on one surface of the capacitor body, the first outer electrode comprises two first outer electrodes, and the second outer electrode comprises a single second outer electrode disposed between the two first outer electrodes.

15. The multilayer chip capacitor of claim 14, wherein the first and second inner electrodes are disposed vertically on the one surface of the capacitor body on which the first and second outer electrodes are formed.

16. The multilayer chip capacitor of claim 14, wherein the first and second outer electrodes are formed on a surface opposite to the one surface of the capacitor body and have the same shapes as those on the one surface.

17. The multilayer chip capacitor of claim 16, wherein the first outer electrode has a portion formed on a side surface of the capacitor body to connect portions of the first outer electrode respectively formed on the one and opposite surfaces of the capacitor body.

18. The multilayer chip capacitor of claim 16, wherein the first inner electrode has an H-shape.

19. The multilayer chip capacitor of claim 16, wherein the second inner electrode has a cross (+) shape.

20. The multilayer chip capacitor of claim 1, wherein the first and second outer electrodes are each formed on one surface of the capacitor body, and respectively comprise two first outer electrodes and two second outer electrodes that are arranged in an alternating manner.

21. The multilayer chip capacitor of claim 20, wherein the first and second inner electrodes are disposed vertically on the one surface of the capacitor body on which the first and second outer electrodes are formed.

22. The multilayer chip capacitor of claim 20, wherein the first and second outer electrodes are further formed on a surface opposite to the one surface of the capacitor body such that the second outer electrodes oppose the first outer electrodes.

23. A circuit board device comprising:
a circuit board including a mounting portion and first and second electrode pads disposed on the mounting portion; and
a multilayer chip capacitor comprising:
a capacitor body mounted on the mounting portion of the circuit board, including a plurality of dielectric layers that are stacked, and having first and second side surfaces opposing each other and a bottom surface connected to the first and second side surfaces;

first and second outer electrodes formed on the bottom surface of the capacitor body, having opposite polarity and respectively connected to the first and second electrode pads;

first and second inner electrodes opposing each other, interleaved with the dielectric layers in the capacitor body, and each including an electrode plate forming capacitance and a lead extending from the electrode plate, the lead of the first inner electrode and the lead of the second electrode being respectively connected to the first and second outer electrodes; and third inner electrodes interposed between the first and second inner electrodes, wherein at least one of the third inner electrodes adjacent to the first inner electrode includes a conductive pattern having the same shape as the lead of the first inner electrode and is connected to the first outer electrode, and at least one of the third inner electrodes adjacent to the second inner electrode includes a conductive pattern having the same shape as the lead of the second inner electrode and is connected to the second outer electrode.

* * * * *